(12) United States Patent
Meng et al.

(10) Patent No.: US 10,419,392 B2
(45) Date of Patent: Sep. 17, 2019

(54) METHOD, DEVICE AND SYSTEM FOR IMPLEMENTING ADDRESS SHARING

(71) Applicant: ZTE Corporation, Shenzhen, Guangdong (CN)

(72) Inventors: Wei Meng, Shenzhen (CN); Cui Wang, Shenzhen (CN)

(73) Assignee: ZTE CORPORATION (CN)

( * ) Notice: Subject to any disclaimer, the term of this patent is extended or adjusted under 35 U.S.C. 154(b) by 1050 days.

(21) Appl. No.: 14/895,911

(22) PCT Filed: Aug. 19, 2013

(86) PCT No.: PCT/CN2013/081796
§ 371 (c)(1),
(2) Date: Jan. 4, 2016

(87) PCT Pub. No.: WO2014/036885
PCT Pub. Date: Mar. 13, 2014

(65) Prior Publication Data
US 2016/0205063 A1 Jul. 14, 2016

(30) Foreign Application Priority Data
Sep. 7, 2012 (CN) .......................... 2012 1 0329742

(51) Int. Cl.
*G06F 15/16* (2006.01)
*H04L 29/12* (2006.01)

(52) U.S. Cl.
CPC ........ *H04L 61/2514* (2013.01); *H04L 61/203* (2013.01); *H04L 61/2061* (2013.01)

(58) Field of Classification Search
CPC ............... H04L 61/2514; H04L 61/203; H04L 61/2061

(Continued)

(56) References Cited

U.S. PATENT DOCUMENTS 6,819,652 B1 * 11/2004 Akhtar .................... H04L 41/08
370/230
8,701,179 B1 * 4/2014 Penno ..................... H04L 63/02
709/227

(Continued)

FOREIGN PATENT DOCUMENTS

CN          1561072 A      1/2005
CN       101790146 A      7/2010

(Continued)

OTHER PUBLICATIONS

Papazoglou, Mike P., "Chapter 6 Registering and Discovering Web Services;" 2008, https://www.cs.colorado.edu/~kena/classes/7818/f08/lectures/lecture_4_uddi.pdf.*

(Continued)

*Primary Examiner* — Quang N Nguyen
(74) *Attorney, Agent, or Firm* — McDonald Hopkins LLC

(57) ABSTRACT

Provided are a method, device and system for implementing address sharing. An address pool configured for unified management over IP addresses is configured on an AAA server; and the AAA server may allocate an IP address to a CGN device according to the configured address pool. By such a technology for implementing address sharing in the present disclosure, IP address resource sharing among CGN devices is implemented, so that problems about resource load sharing among the CGN devices may be solved, a sharing rate of IP address resources is increased, and resource optimization may be implemented; and moreover, in terms of IP address management, a more available platform is provided for an operating company. In addition, the IP addresses are managed by the AAA server in a unified manner, and then the address pool is not required to be configured on the CGN device, so that the CGN device may be started without any address pool.

18 Claims, 10 Drawing Sheets

510
An address pool configured for unified management over IP addresses is configured on an AAA server 520
The AAA server allocates an IP address to a CGN device according to the configured address pool

(58) Field of Classification Search
USPC ....... 709/203, 206, 217, 219, 225, 226, 228, 709/230, 232, 238, 245; 370/254, 392
See application file for complete search history.

(56) References Cited

U.S. PATENT DOCUMENTS

| | | | | |
|---|---|---|---|---|
| 9,553,805 | B2* | 1/2017 | Zha | H04L 61/2525 |
| 10,038,646 | B2* | 7/2018 | Zheng | H04L 61/6063 |
| 10,164,937 | B2* | 12/2018 | Yuan | H04L 61/2514 |
| 10,320,738 | B2* | 6/2019 | Hong | H04L 61/10 |
| 2002/0138614 | A1* | 9/2002 | Hall | H04L 29/12009 709/225 |
| 2007/0041388 | A1* | 2/2007 | Russell | H04L 29/12066 370/400 |
| 2007/0058567 | A1* | 3/2007 | Harrington | H04L 12/2856 370/254 |
| 2007/0203999 | A1* | 8/2007 | Townsley | H04L 29/1282 709/207 |
| 2008/0019270 | A1* | 1/2008 | Grandmaitre | H04L 29/12273 370/230 |
| 2008/0232304 | A1* | 9/2008 | Mooney | H04W 74/0875 370/328 |
| 2009/0296566 | A1* | 12/2009 | Yasrebl | H04L 41/5087 370/221 |
| 2010/0278070 | A1* | 11/2010 | Melia | H04L 29/12367 370/254 |
| 2011/0170517 | A1* | 7/2011 | Bakker | H04W 36/0033 370/331 |
| 2011/0213893 | A1* | 9/2011 | Morris | H04L 69/22 709/232 |
| 2011/0265101 | A1* | 10/2011 | Chaganti | G06F 9/4825 719/328 |
| 2013/0067062 | A1* | 3/2013 | Gaitonde | H04L 61/103 709/224 |
| 2013/0067110 | A1* | 3/2013 | Sarawat | H04L 61/2517 709/238 |
| 2013/0166776 | A1* | 6/2013 | Gao | H04L 61/2532 709/245 |
| 2013/0173797 | A1* | 7/2013 | Poirer | H04L 61/2528 709/225 |
| 2013/0227170 | A1* | 8/2013 | Zha | H04L 61/2582 709/245 |
| 2013/0290561 | A1* | 10/2013 | Qian | H04L 12/1403 709/238 |
| 2013/0346629 | A1* | 12/2013 | Wang | H04L 61/2532 709/245 |
| 2014/0006568 | A1* | 1/2014 | Subramanian | H04L 61/2061 709/220 |
| 2015/0244590 | A1* | 8/2015 | Lin | H04L 49/00 370/392 |
| 2017/0195256 | A1* | 7/2017 | Javali | H04L 49/25 |

FOREIGN PATENT DOCUMENTS

| | | | |
|---|---|---|---|
| CN | 101854285 | A | 10/2010 |
| CN | 102158569 | A | 8/2011 |
| CN | 102594933 | A | 7/2012 |
| CN | 102664971 | A | 9/2012 |
| CN | 104244217 | A * | 12/2014 |
| EP | 2456173 | A1 | 5/2012 |

OTHER PUBLICATIONS

Juniper Networks, "Carrier Grade NAT Implementation Guide;" 2011, https://www.juniper.net/us/en/local/pdf/implementation-guides/8010076-en.pdf.*

Doyle, Jeff, "Understanding Carrier Grade NAT and Why It's Now Called Large Scale NAT;" Sep. 4, 2009, https://www.networkworld.com/article/2237054/cisco-subnet/understanding-carrier-grade-nat.html.*

Rekhter, Y., Moskowitz, B., Karrenberg, D., de Groot, G.J., Lear, E., "Address Allocation for Private Internets;" Feb. 1996, https://tools.ietf.org/html/rfc1918.*

HP, "HP-UX AAA Server A.08.00.01 Administrator's Guide HP-UX 11iv2 and HP-UX 11iv3," Feb. 2009, http://h20628.www2.hp.com/km-ext/kmcsdirect/emr_na-c02034942-1.pdf (Year: 2009).*

International Search Report in international application No. PCT/CN2013/081796, dated Nov. 28, 2013.

English Translation of the Written Opinion of the International Search Authority in international application No. PCT/CN2013/081796, dated Nov. 28, 2013.

* cited by examiner

Fig. 1.1
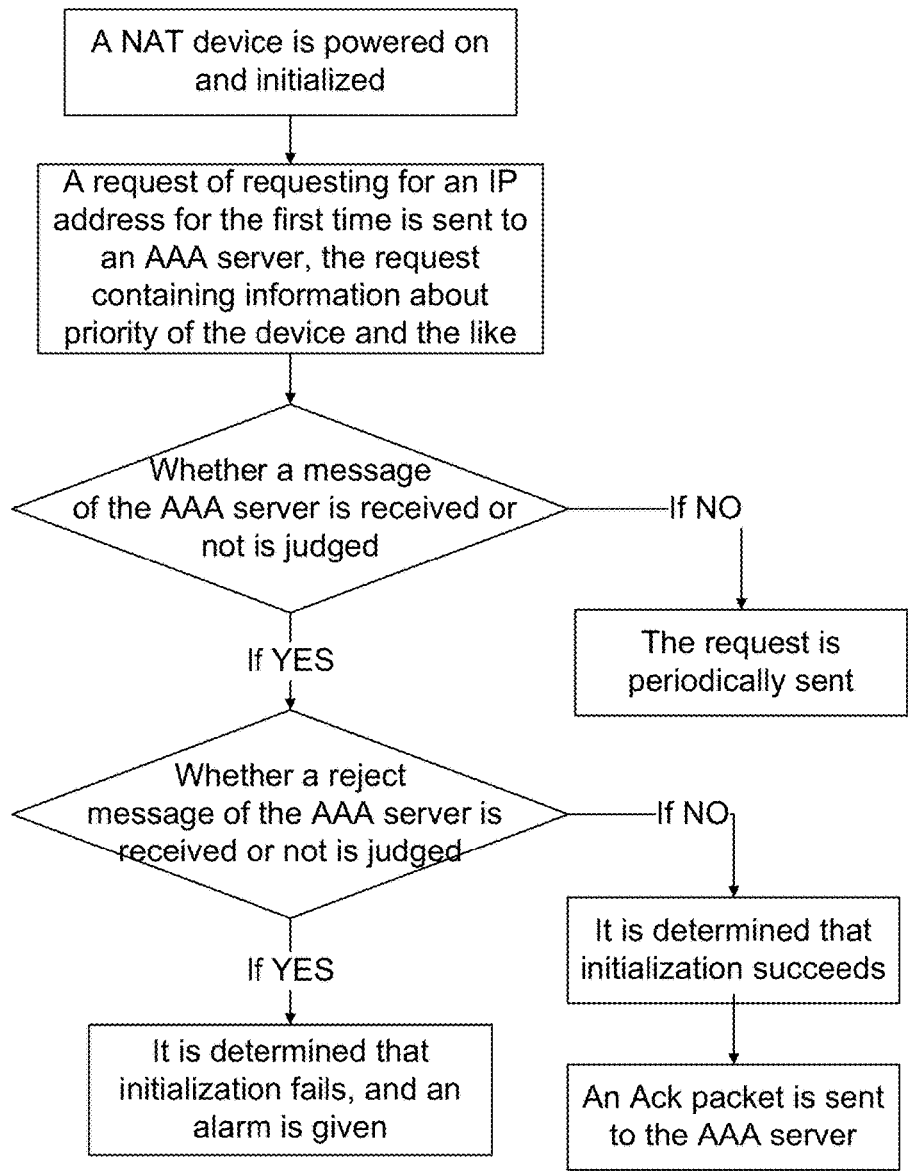

Fig. 1.2
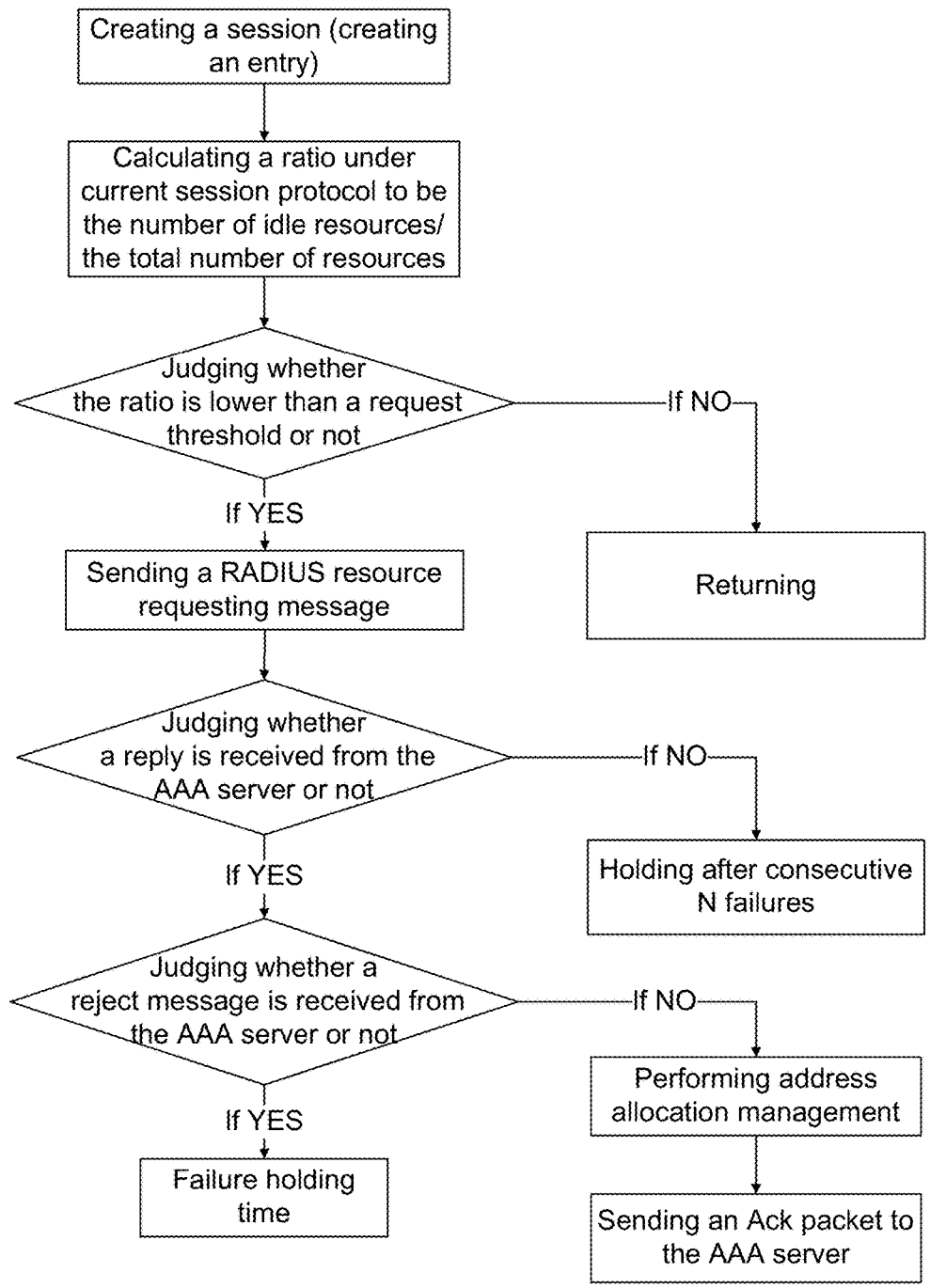

Fig. 1.3
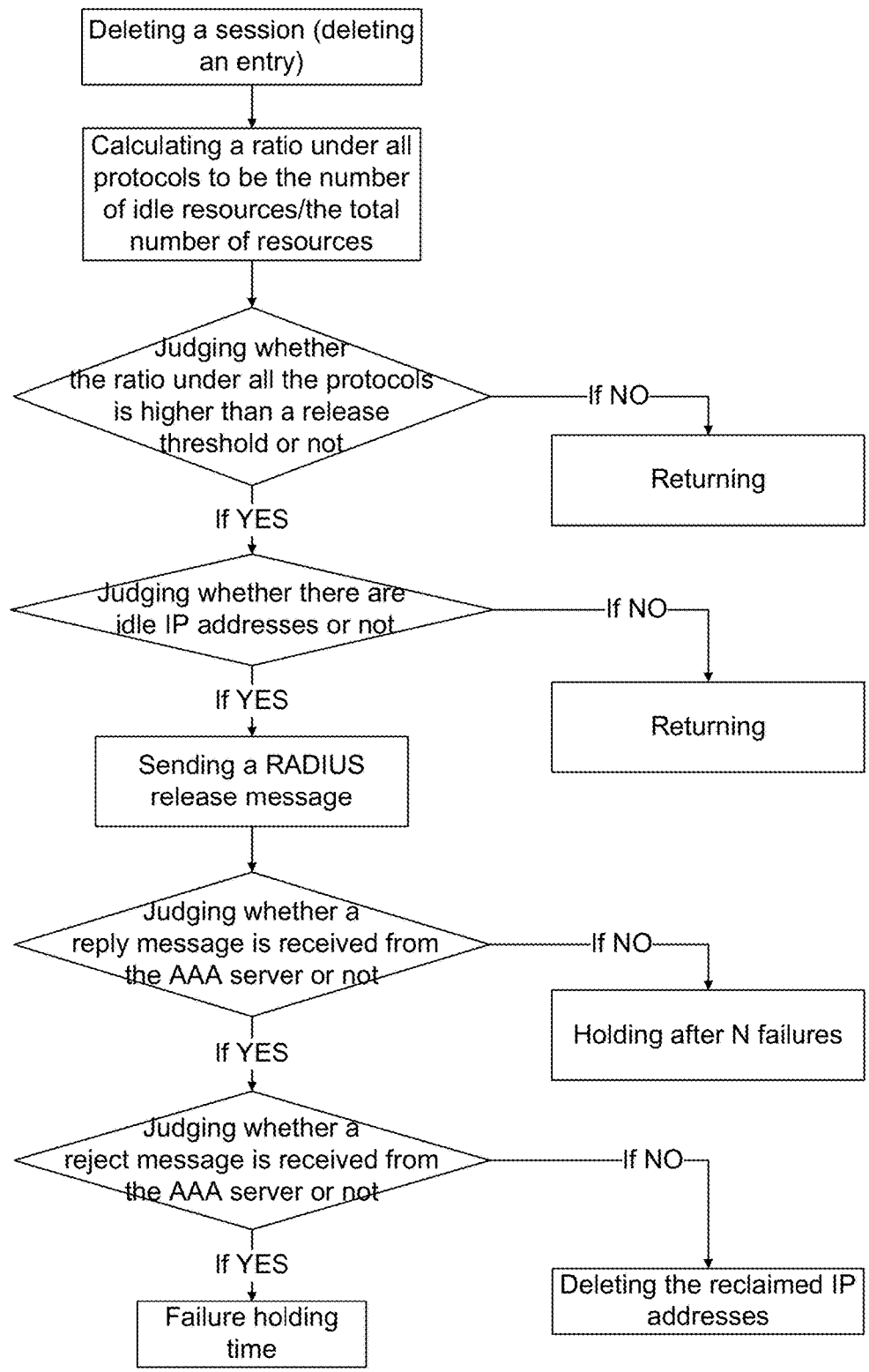

Fig. 2.1
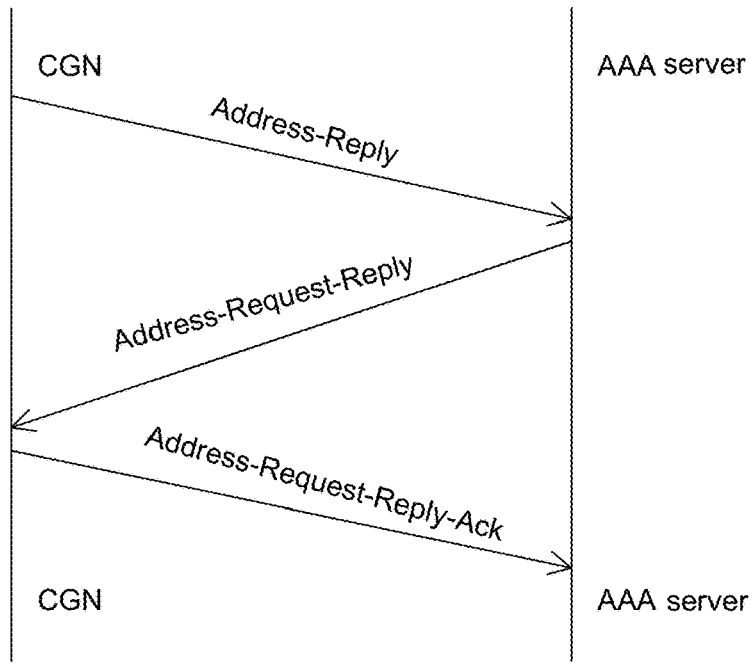
Fig. 2.2
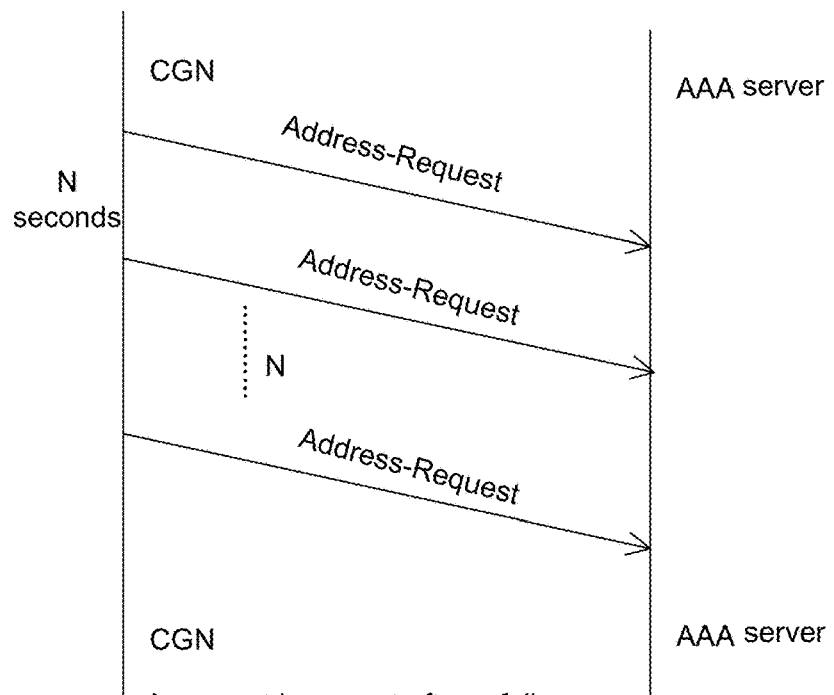
A request is re-sent after a failure holding time T1; and initialization failure alarming processing is adopted for a pre-requesting flow Fig. 2.3
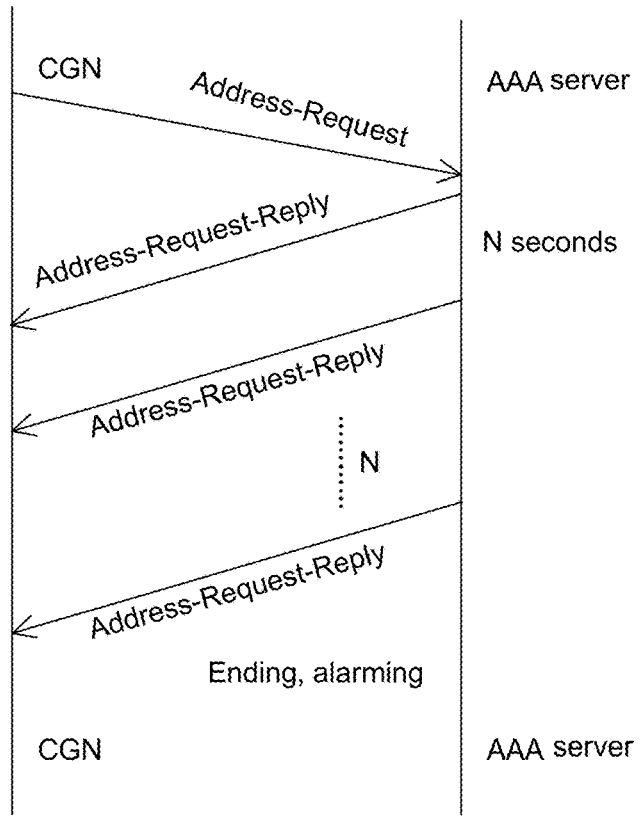
Fig. 2.4
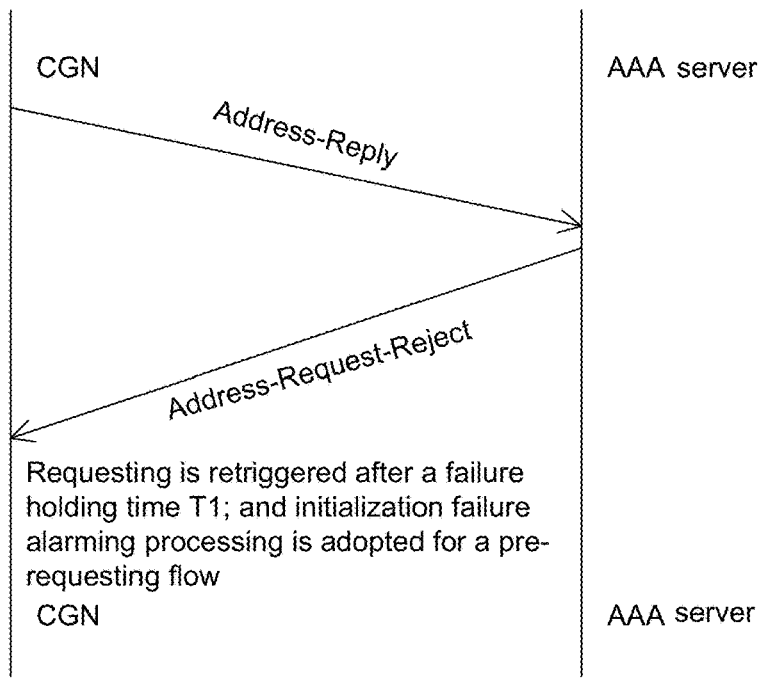

Fig. 2.5
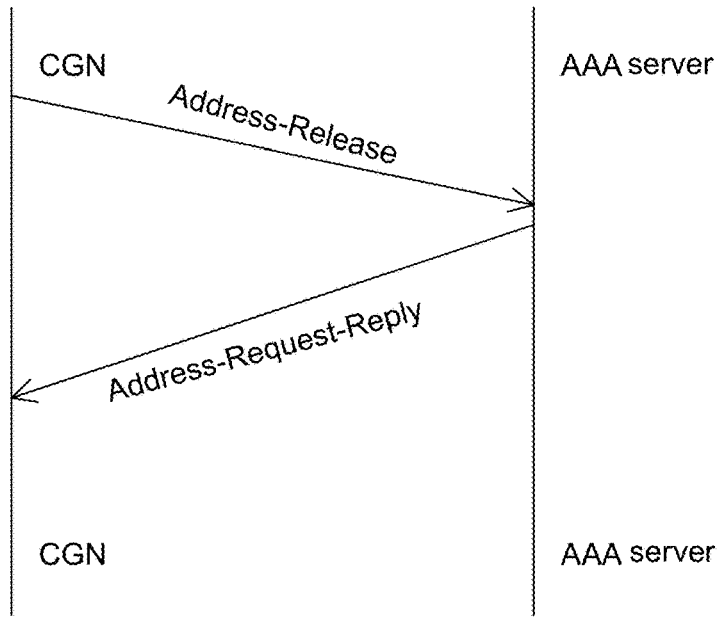
Fig. 2.6
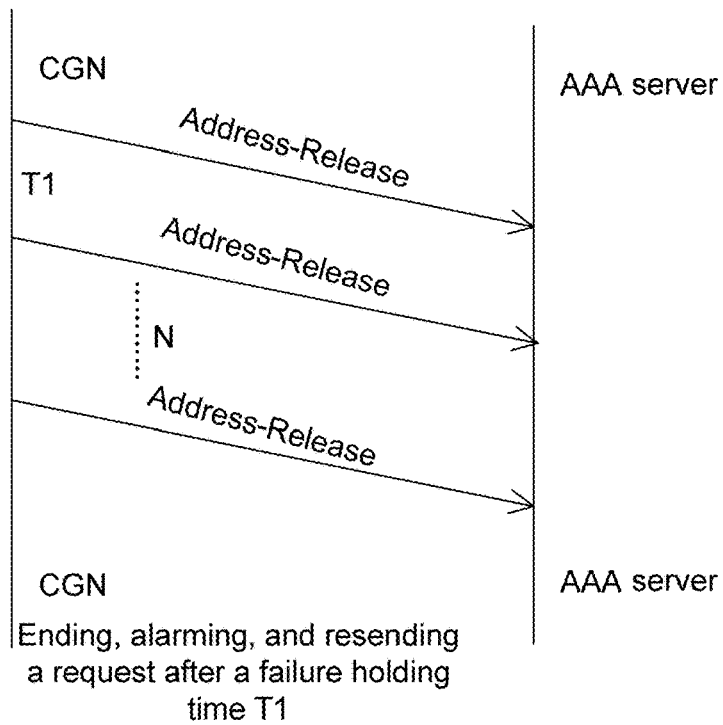

Fig. 2.7
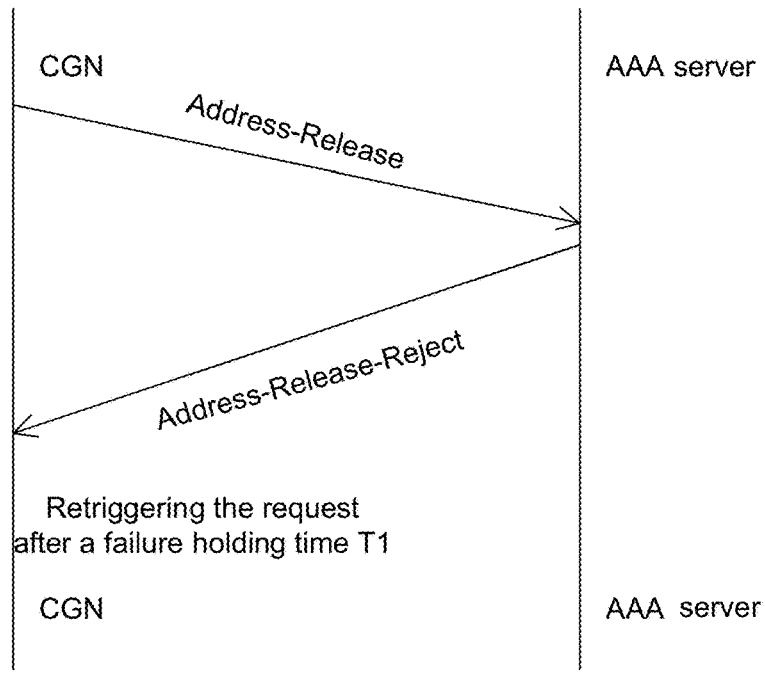
Fig. 3.1
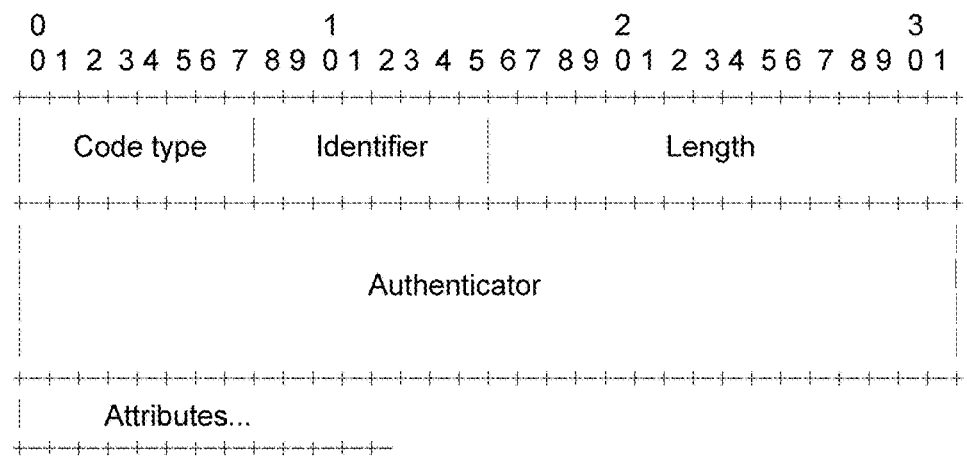
Code
    31        Address-Request
    32        Address-Request-Reply
    33        Address-Request-Reply-Ack
    34        Address-Request-Reject
    35        Address-Release
    36        Address-Release-Reply
    37        Address-Release-Reject

Fig. 3.2

Attributes 1-device number

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |             Value             | ······
+-+-+-+-+-+-+-+-+-+-+-+-+-+-+-+-+-+-+-+-+-+-+-+-+-+-+-+-+-+-+-+-+
```

Type 1. representing the device number

Length

4

Value

Corresponding device number

Fig. 3.3

Attributes 2-priority

```
 0                   1                   2
 0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|      Type     |     Length    | revd |  Value |
+-+-+-+-+-+-+-+-+-+-+-+-+-+-+-+-+-+-+-+-+-+-+-+-+
```

Type 2. representing priority

Length

1

Revd 0, subsequently available for extension of priority

Value

Priority, 4 bit, 0-15 grade, the priority is higher if the value is greater

Fig. 3.4

Attributes 3-IP address management cell information

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |             Value              ......
+-+-+-+-+-+-+-+-+-+-+-+-+-+-+-+-+-+-+-+-+-+-+-+-+-+-+-+-+-+-+-+-+
```

Type 3. representing cell information

Length

4+4* the number of IP addresses

Value

The first 4 bytes of the value form a Cell ID, and the latter bytes are IP addresses
   Cell ID + corresponding set of IP Address values
   Cell ID occupies 4 bytes

Fig. 3.5

Attributes 4-step size

```
 0                   1                   2
 0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|     Type      |    Length     |     Value     |
+-+-+-+-+-+-+-+-+-+-+-+-+-+-+-+-+-+-+-+-+-+-+-+-+
```

Type 4. representing the step size for requesting for IP address management cells Length

1

Value 1-255

METHOD, DEVICE AND SYSTEM FOR IMPLEMENTING ADDRESS SHARING

TECHNICAL FIELD

The present disclosure relates to the field of communications, and in particular to a method, device and system for implementing address sharing.

BACKGROUND

Along with exhausting of Internet Protocol version 4 (IPv4) addresses, a Network Address Translation (NAT) technology is applied more and more widely. However, address resources are not allowed to be dynamically shared among Carrier Grade NAT (CGN) devices and NAT public network address pools are directly or indirectly configured on the devices, which may cause the phenomenon that some devices are in shortage of address pool resources but some devices are redundant in address pool resources.

For an operating company, the total IP addresses are limited, and regional and temporal unbalance may usually cause the phenomenon that IP addresses are constrained sometimes but redundant sometimes.

For example, both A and B have N IP addresses, the IP addresses of A are exhausted because of large-scale activities held in A, and an address utilization rate of B is sharply reduced to 50 percent because of population movement from B to A.

SUMMARY

In view of this, the embodiments of the present disclosure are intended to provide a method, device and system for implementing address sharing.

In order to achieve the purpose, the technical solutions of the embodiments of the present disclosure are implemented as follows.

A method for implementing address sharing is provided, wherein an Authentication, Authorization and Accounting (AAA) server is configured with an address pool configured for unified management over IP addresses, the method includes that the AAA server allocates an IP address to a CGN device according to the address pool.

In the solution, the method may further include:
the AAA server performs priority privilege management for the CGN device; and
when the CGN device is started and requests for an IP address, the AAA server allocates a corresponding number of IP addresses to the CGN device according to priority of the CGN device.

In the solution, the method may further include:
the priority is configured on the CGN device, or
the priority of the CGN device is sent to the CGN device through a Remote Authentication Dial in User Service (RADIUS) message.

In the solution, the method may further include:
the CGN device is configured with an request/release threshold serving as a reference for calculating a resource idleness rate, wherein
for the request threshold, the CGN device is triggered to re-request for an IP address when a resource idleness rate under a protocol is higher than the request threshold;
for the release threshold, the CGN device is triggered to release the IP address when a resource idleness rate under a protocol is higher than the release threshold.

In the solution, the request/release threshold may correspond to different protocols, wherein
requesting for an IP address resource is triggered when the resource idleness rate under any protocol corresponding to the request/release threshold is lower than the request threshold; and
release of the IP address resource is triggered when the resource idleness rate under all protocols corresponding to the request/release threshold is higher than the release threshold.

In the solution, the method may further include:
when the CGN device re-requests for an IP address resource after an request threshold is reached, requesting, by the CGN device, the IP address resource according to a configured step size.

In the solution, RADIUS message interaction is adopted between the CGN device and the AAA server, and the method may further include:
adding four types to an attributes field of a RADIUS message: a device number, priority, IP address management cell information, and a step size.

In the solution, the CGN device is configured with an IP address releasing policy which comprises one of:
a centralized policy: in a release state, IP addresses assigned to new sessions are concentrated to IP addresses of one or more cells, IP address resources of the other cells enter an idle state after corresponding sessions are aged or manually deleted, and then the whole cells are released;
a coercive policy: in a release state, a cell with fewer sessions is selected, and the cell is not allowed to be occupied by a new session; moreover, all sessions occupying an
IP address of the cell are deleted from the cell, and the cell and the IP address of the cell are coercively released;
an ignoring policy: in a release state, the release state is ignored when a new session is created if there is no idle address cell, and an IP address resource is continued to be assigned to generate a session according to an original mode; and after an idle cell is generated, a releasing flow is started.

In the solution, the method may further include:
the AAA server records a log involving IP address allocation, the log including following fields:
a timestamp;
a device number (identifying a device requesting/releasing an IP address);
an allocated IP address;
a message type (requesting, releasing); and
an execution result (success, failure).

A device for implementing address sharing is provided, the device being configured with an address pool for unified management over Internet Protocol (IP) addresses, and the device being configured to allocate an IP address to a Carrier Grade Network Address Translation (CGN) device according to the address pool.

In the solution, the device may be configured to perform priority privilege management for the CGN device; and
when the CGN device is started and requests for an IP address, the device is configured to allocate a corresponding number of IP addresses to the CGN device according to priority of the CGN device.

In the solution, the CGN device is further configured with an request/release threshold serving as a reference for calculating a resource idleness rate, wherein
for the request threshold, the CGN device is triggered to re-request for an IP address when a resource idleness rate under a protocol is higher than the request threshold;

for the release threshold, the CGN device is triggered to release the IP address when a resource idleness rate under a protocol is higher than the release threshold.

In the solution, the request/release threshold corresponds to different protocols, wherein the CGN device is configured to request for an IP address resource when the resource idleness rate under any protocol corresponding to the request/release threshold is lower than the request threshold; and the CGN device is configured to release the IP address resource when the resource idleness rate under all protocols corresponding to the request/release threshold is higher than the release threshold.

In the solution, the CGN device may be further configured to, when re-requesting for an IP address resource after the request threshold is reached, request for the IP address resource according to a configured step size.

In the solution, RADIUS message interaction may be adopted between the CGN device and the device, and the device may be configured to:

add four types to an attributes field to a RADIUS message: a device number, priority, IP address management cell information, and a step size.

In the solution, the CGN device may be configured with an IP address releasing policy which includes one of:

a centralized policy: in a release state, IP addresses assigned to new sessions are concentrated to IP addresses of one or more cells, IP address resources of the other cells enter an idle state after corresponding sessions are aged or manually deleted, and then the whole cells are released;

a coercive policy: in a release state, a cell with fewer sessions is selected, and the cell is not allowed to be occupied by a new session; moreover, all sessions occupying an IP address of the cell are deleted from the cell, and the cell and the IP address of the cell are coercively released;

an ignoring policy: in a release state, the release state is ignored when a new session is created if there is no idle address cell, and an IP address resource is continued to be assigned to generate a session according to an original mode; and after an idle cell is generated, a releasing flow is started.

In the solution, the device may be further configured to record a log involving IP address allocation, the log including the following fields:

a timestamp;

a device number (identifying the device requesting/releasing an IP address);

an allocated IP address;

a message type (requesting, releasing); and an execution result (success and failure).

In the solution, the device may be an AAA server, including an AAA server management module configured to perform management as follows:

address pool management;

priority privilege management; and log management.

In the solution, the CGN device may include a user configuration module, an IP address resource requesting/releasing module and an IP address resource management module, wherein the user configuration module is configured to perform configuration involving a sharing policy; the sharing policy includes at least one of following: priority, a threshold and a step size;

the IP address resource requesting/releasing module is configured to calculate a resource idleness rate and to request/release the IP address according to the resource idleness rate; and the IP address resource management module is configured to manage an IP address resource.

A system for implementing address sharing is provided, which includes an AAA server and a CGN device, wherein the AAA server is configured with an address pool configured for unified management over IP addresses, and the AAA server is configured to allocate an IP address to the CGN device according to the address pool; and the CGN device is configured to interact with the AAA server and perform IP address management including application and/or releasing of the IP addresses.

Wherein, the AAA server includes an AAA server management module, configured to perform management as follows:

address pool management;

priority privilege management; and log management.

In the solution, the CGN device includes a user configuration module, an IP address resource requesting/releasing module and an IP address resource management module, wherein the user configuration module is configured to perform configuration involving a sharing policy; the sharing policy includes at least one of following: priority, a threshold and a step size;

the IP address resource requesting/releasing module is configured to calculate a resource idleness rate and request/release the IP address according to the resource idleness rate; and the IP address resource management module is configured to manage an IP address resource.

By such a technology for implementing address sharing in the embodiments of the present disclosure, IP address resource sharing among CGN devices is implemented, so that problems about resource load sharing among the CGN devices can be solved, a sharing rate of the IP address resources is increased, and resource optimization can be achieved; and moreover, in terms of IP address management, a more convenient platform is provided for an operating company. In addition, the IP addresses are managed by the AAA server in a unified manner, and then an address pool is not required to be configured on the CGN device, so that the CGN device may be started without any address pool.

BRIEF DESCRIPTION OF THE DRAWINGS

FIG. 1.1 is a flowchart of requesting for an IP address when a CGN device is powering-on (initialized) according to an embodiment of the present disclosure;

FIG. 1.2 is a flowchart of a CGN device re-requesting for an IP address according to an embodiment of the present disclosure;

FIG. 1.3 is a flowchart of releasing an IP address by a CGN device according to an embodiment of the present disclosure;

FIG. 2.1 to FIG. 2.7 are flowcharts of interaction between a CGN device and an AAA server (which may be called AAA for short) according to an embodiment of the present disclosure;

FIG. 3.1 is a diagram of a message format after addition of a code type to a RADIUS message according to an embodiment of the present disclosure;

FIG. 3.2 is a diagram of a message format after addition of a device number attribute to a RADIUS message according to an embodiment of the present disclosure;

FIG. 3.3 is a diagram of a message format after addition of a priority attribute to a RADIUS message according to an embodiment of the present disclosure;

FIG. 3.4 is a diagram of a message format after addition of an IP address management cell attribute to a RADIUS message according to an embodiment of the present disclosure;

FIG. 3.5 is a diagram of a message format after addition of a step size attribute to a RADIUS message according to an embodiment of the present disclosure;

DETAILED DESCRIPTION

Figure 4:
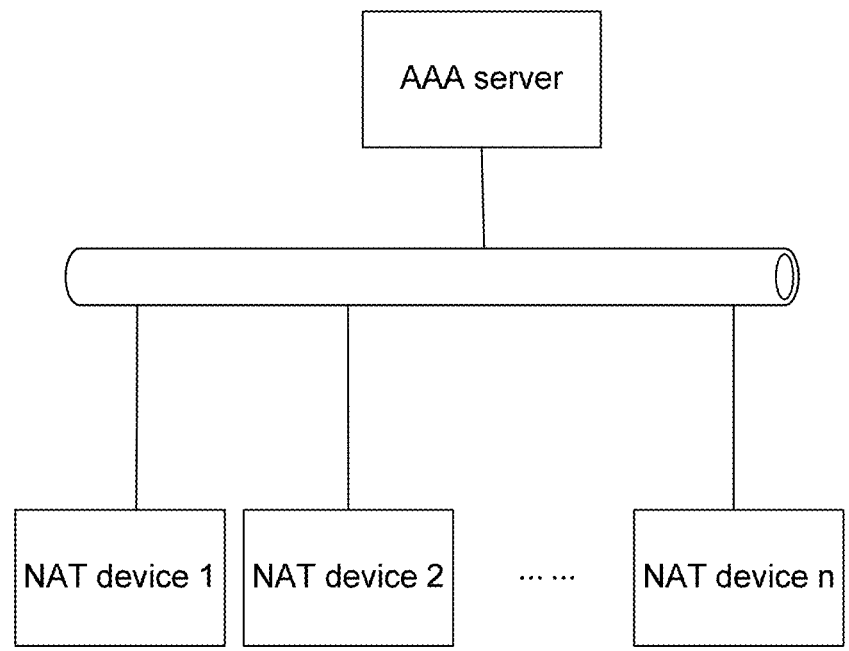
FIG. 4 is a diagram of a typical application scenario according to an embodiment of the present disclosure.

In practical application, it is necessary to share one or more IP address resources among multiple CGN devices (including, but not limited to, routers/firewalls with a NAT or Network Address Port Translation (NAPT) function) to fulfil the aim of optimizing the address resources. The NAPT may also be called Port Address Translation (PAT).

In order to implement sharing of an IP address resource, the following modules may be employed:

A. a user configuration module:

the user configuration module is configured to perform configuration involving IP addresses, and may perform at least one of the following operation:

1) configuration of device sharing priority;
2) configuration of an request threshold;
3) configuration of a release threshold;
4) configuration of an occupation policy in a release state;
5) configuration of a requesting step size; and
6) configuration of a failure holding time;

B. an IP address resource requesting/releasing module:

the IP address resource requesting/releasing module is configured to calculate a resource idleness rate and request/release an IP address according to the resource idleness rate, and may perform at least one of the following operation:

1) calculation of the resource idleness rate; and
2) RADIUS message processing.

C. an IP address resource management module is configured to manage IP address resources, for example, executing the occupation policy in the release state.

D. an AAA server management module:

the AAA server management module may perform at least one of the following operation:

1) address pool management;
2) priority privilege management; and
3) log management.

In order to implement sharing of the IP address resource, the following operation may be executed.

1. Extension of a RADIUS Message the RADIUS message is extended by increasing the value of a code-type field of the RADIUS message; as shown in FIG. 3.1, the value of the code-type field may be, but not limited to, a range as shown in FIG. 3.1;

four types are added to an attributes field, which are: a device number, priority, cell information and a step size; message formats after the addition of the four types are shown in FIG. 3.2 to FIG. 3.5 respectively;

2. Configuration of the AAA Server step 1: configuration of an address pool after the address pool is configured, one or more IP addresses may be bound to one cell, and the cell serves as a basic unit for management of requesting for/releasing of IP addresses;

an algorithm for a utilization rate of the address pool may be: (the number of sessions*100)/(65535*the number of IP addresses*the number of protocols), and the algorithm is applied to PAT. For NAT, an algorithm for the utilization rate of the address pool may be: the number of IP addresses which have been used/the total number of IP addresses;

step 2: priority privilege management the AAA server performs priority privilege management for the CGN device to perform IP address allocation, according to the priority, for a first request (pre-allocation) of the CGN device for a basic IP address; different numbers of IP addresses are pre-allocated for different priority levels;

step 3: log management the AAA server performs log management and records information for query;

a log management content includes, but is not limited to, the following fields:

1) a timestamp;
2) a device number (identifying a device requesting/releasing an IP address);
3) an allocated IP address;
4) a message type (requesting, releasing); and
5) an execution result (success, failure);

3. Configuration Performed on the CGN Device step 1: the sharing priority of the CGN device is configured;

the sharing priority determines the number of IP addresses which may be acquired at one time after the initialization of the CGN device and an upper limit and a lower limit of the number of the IP addresses of the CGN device;

the sharing priority is only for the first request for (pre-allocation) the IP address resource;

specially, configuration of an address pool on the CGN device may be avoided;

step 2: a request/release threshold is configured, wherein the threshold may serve as a reference for calculating a resource idleness rate.

PAT is performed on the basis of a protocol, and the same port may be multiplexed by different protocols. Therefore, protocol distinction is required by judgement in the threshold;

specifically, for the request threshold, the CGN device is triggered to re-request for the IP address (cell) when the resource idleness rate under a certain protocol is lower than the request threshold;

for the release threshold, the CGN device is triggered to release the IP address (cell) when the resource idleness rate under a certain protocol is higher than the release threshold;

in practical application, the request threshold may be higher than the release threshold;

a manner for calculating the total number of resources under a certain protocol is: 65535*the number of IP addresses;

a manner for calculating the number of idle resources under a certain protocol is: the sum of the number of unoccupied ports of each IP address;

a manner for calculating the resource idleness rate under a certain protocol is: the number of idle resources/the total number of resources;

the protocol includes, but not limited to, a Transmission Control Protocol (TCP), a User Datagram protocol (UDP), an Internet Control Message Protocol (ICMP) and the like, and when the resource idleness rate under any protocol is lower than the request threshold, requesting for an IP address resource is triggered; when the resource idleness rate under all the protocols is higher than the release threshold, release of the IP address resource may be triggered;

if a specified address pool is classified into a NAT-type address pool and a PAT-type address pool, then the single IP address resource number of the NA-type address pool is 65535, which means that one NAT session occupies 65535 resources; and such an operating manner is applied to a pure NAT scenario, a pure PAT scenario and a NAT/PAT mixed scenario;

the manner for calculating the resource idleness rate is also applied to a mapping mode (EIM/ADM/APDM), a filtering mode (EIF/ADF/APDF) and the like for CGN.

step 3: an address occupation policy under resource releasing is configured;

when the resource idleness rate is higher than the release threshold, if the IP addresses of all cells of the CGN device are occupied by sessions, there are no cells releasable; at this time, the configured IP address occupation policy may include, but not limited to:

1) a centralized policy:

that is, in the release state, IP addresses (and ports) assigned to new sessions are concentrated to IP addresses of one or more cells as much as possible, IP address resources of the other cells enter an idle state after corresponding sessions are aged or manually deleted, and then the whole cells are released;

2) a coercive policy:

that is, in the release state, a cell with fewer sessions is selected, and the cell is not allowed to be occupied by a new session, moreover, all the sessions occupying an IP address of the cell are deleted from the cell, and the IP address is coercively released;

3) an ignoring policy:

that is, in the release state, the release state is ignored when a new session is created if there is no idle cell (the idle cell refers to the one in which there is no IP address occupied by a session), and an IP address resource is assigned to generate the session; after an idle cell is generated, a releasing flow is started;

step 4: the step size for requesting for an IP address is configured;

the step size for requesting for an IP address is the number of the IP address management cells requested by the CGN device to the AAA server when the resource utilization rate reaches the request threshold;

in practical application, the IP address resources requested by the CGN device which is started for the first time are allocated by the AAA server according to the priority in a unified manner; and when IP address resources are re-requested after the request threshold is reached, the IP address resources may be requested according to the configured step length;

step 5: the failure holding time is configured;

the failure holding time is supposed to be T1, that is, the CGN device is not allowed to send a requesting/releasing request to the AAA server within a time range of T1 after failing in request/release.

4. An IP Address Requesting/Releasing Flow 4.1: a pre-request flow of the CGN device, as shown in FIG. 1.1;

as shown in FIG. 2.1, a normal flow includes:

step 1:

the CGN device is started to work, a NAT module is initialized, and the IP address resource of the AAA server is requested (pre-requested) through a RADIUS message, a code type is encapsulated to be Address-Request (as shown in FIG. 3.1), and a device number (as shown in FIG. 3.2) and priority (as shown in FIG. 3.3) are filled to the attributes field;

step 2:

the AAA server receives the RADIUS message for pre-requesting the IP address resource, allocates N cells corresponding to the priority at one time according to the priority in the message, encapsulates the code type to be Address-Request-Reply, fills the device number (as shown in FIG. 3.2), cell Identifiers (IDs) and the IP address (as shown in FIG. 3.4) to the attributes field, and sends a message to the requesting CGN device;

if multiple cells are required to be sent, the attributes field is encapsulated to the tail of the message for each cell;

step 3:

the CGN device receives the message with the code type Address-Request-Reply, and performs address management; at this time, the CGN device re-sends a message with a code type Address-Request-Reply-Ack to the AAA server, wherein the device number (as shown in FIG. 3.2) is filled to the attributes field; and the initialization of the CGN device is implemented;

an abnormal flow includes:

step 4 (as shown in FIG. 2.2):

when step 1 in the normal flow is executed, the CGN device requests (pre-requests) for the IP address resource of the AAA server through the RADIUS message, but does not receive a message response from the AAA server; at this time, the CGN device may consecutively send the same pre-requesting message for N times, and if no responses are received, it is determined that initialization fails and an alarm is given;

step 5 (as shown in FIG. 2.4):

if the AAA server discovers that there are no sufficient IP addresses to be allocated to the CGN device when step 2 in the normal flow is executed, the AAA server sends a message with a code type Address-Request-Reject to the CGN device, wherein the device number (as shown in FIG. 3.2) is filled to the attributes field; after the CGN device receives the message, it is determined that initialization fails and an alarm is given;

step 6 (as shown in FIG. 2.3):

if the AAA server does not receive from the CGN device a message with the code type Address-Request-Reply-Ack defined in the RADIUS attribute after step 3 in the normal flow is executed, then the AAA server repeatedly sends the message in step 2 in the normal flow to the CGN device; if the AAA server does not receive a message with the code type Address-Request-Reply-Ack (it is indicated that the CGN device has a failure or communication protocol at this time) after repeatedly sending the message for N times, the related cell is locked and an alarm is given;

step 7:

the CGN device is powered off and restarted to request for an IP address for the first time during running; and at this time, if the AAA server discovers that a plurality of cells have been allocated to the related device after receiving the message in Step 1 in the normal flow, the AAA server sends all the cells to the CGN device through the message with the code type Address-Request-Reply in step 2 in the normal flow;

4.2: an IP address re-requesting flow of the CGN device (as shown in FIG. 1.2)

a normal flow includes (as shown in FIG. 2.1):

step 1:

every time when a session is created after the CGN device normally works, the CGN device compares a current resource idleness rate under the protocol with the configured request threshold;

step 2:

when the resource idleness rate is lower than the configured request threshold, the CGN device sends a RADIUS message for requesting for an IP address, the code type being encapsulated to be Address-Request (as shown in FIG. 3.1) and the device number (as shown in FIG. 3.2) and the step size (as shown in FIG. 3.5) being filled into the attributes field;

step 3:

after receiving the RADIUS message for requesting for the IP address, the AAA server allocates N cells in the related address pool at one time according to the step length in the message, encapsulates the code type to be Address-Request-Reply, fills the device number (as shown in FIG. 3.2), cell Identifiers (IDs) and the IP address (as shown in FIG. 3.4) to the attributes field, and sends a message to the requesting CGN device;

if multiple cells are required to be sent, the attributes field is encapsulated to the tail of the message for each cell;

step 4:

the CGN device performs address management after receiving a response from the AAA server; at this time, the CGN device re-sends a message with a code type Address-Request-Reply-Ack to the AAA server, the device number (as shown in FIG. 3.2) being filled to the attributes field; and the initialization of the CGN device is implemented;

an abnormal flow includes:

step 5 (as shown in FIG. 2.4):

if the AAA server discovers that there are no sufficient IP addresses to be allocated to the CGN device when step 3 in the normal flow is executed, the AAA server sends a message with a code type Address-Request-Reject to the CGN device; the CGN device sets a timer after receiving the message, wherein the timed time which is set by the timer is the configured failure holding time T1; the CGN device will not re-send an IP address request within T1;

step 6 (as shown in FIG. 2.2):

if the CGN device requests for the IP address resource to the AAA server through the RADIUS message but does not receive any message response from the AAA server when step 2 in the normal flow is executed, then the CGN device may consecutively send the same requesting message for N times, and sets the timer if not receiving any response, the timed time which is set by the timer is the configured failure holding time T1; the CGN device will not re-send the IP address request within T1;

step 7 (as shown in FIG. 2.3):

if the AAA server does not receive a message with the code type Address-Request-Reply-Ack from the CGN device after step 4 in the normal flow is executed, the AAA server repeatedly sends the message in step 2 in the normal flow to the CGN device; and if the AAA server does not receive a message with the code type Address-Request-Reply-Ack (it is indicated that the CGN device has a failure or communication protocol at this time) after repeatedly sending the message for N times, the related cell is locked and an alarm is given;

4.3: an IP address releasing flow of the CGN device (as shown in FIG. 1.3)

a normal flow includes (as shown in FIG. 2.5):

step 1:

when each session is deleted, the CGN device compares the current resource idleness rate under the protocol with the configured release threshold;

step 2:

when the resource idleness rate is higher than the configured release threshold, the CGN device detects whether there is an idle cell or not, that is, whether there is a cell where all IP addresses are not occupied by sessions or not;

step 3:

if there is an idle cell, the CGN device sends a RADIUS message for releasing the IP address, the code type is encapsulated to be Address-Release (as shown in FIG. 3.1) and the device number (as shown in FIG. 3.2) and cell information (as shown in FIG. 3.4) is filled into the attributes field;

during release, the cell is required to be released wholly, and individual release of the IP addresses is not allowed;

step 4:

if there is no idle cell, a new session is subsequently created for the resource according to a policy in the release state until the idle cell is generated after session aging, static mapping deletion and other operations are performed;

step 5:

the AAA server releases the resources of the cells after receiving the message in step 3, and sends a message with the code type Address-Release-Reply to the CGN device;

step 6:

the CGN device releases and deletes the cell after receiving the message in step 5.

an abnormal flow includes:

step 7 (as shown in FIG. 2.7):

if the AAA server discovers that it is impossible to implement the releasing flow because of its own reason when step 5 in the normal flow is executed, the AAA server sends a message with the code type Address-Release-Reject to the CGN device; the CGN device sets the timer after receiving the message, the timed time which is set by the timer is the configured failure holding time T1; the CGN device will not send the cell releasing request within T1;

step 8 (as shown in FIG. 2.6):

if the CGN device does not receive the message in step 5 when step 6 in the normal flow is executed, the CGN device may repeatedly send the same releasing message in step 3 for N times, and sets the timer if not receiving any response, the timed time which is set by the timer is the configured failure holding time T1; and the CGN device will not send the cell releasing request within T1;

4.4: other abnormal conditions which may be further considered condition 1:

the CGN device shall have a duplication checking function, that is, the CGN device is required to consecutively return a message with the code type Address-Request-Reply-Ack or another corresponding message when consecutively receiving the same message with the code type Address-Request-Reply or a message of another type, but the CGN device may not locally receive the same cell for many times;

condition 2:

when the CGN device fails and cannot be repaired, the AAA server may support manual release of the cell allocated to the CGN device;

condition 3:

the priority of the CGN device determines the upper limit and lower limit (determined by the operating company) of the number of the cells of the CGN device, releasing operation is stopped when the number of the cells of the CGN device reaches the lower limit, and requesting operation is stopped when the number of the cells of the CGN device reaches the upper limit; and condition 4:

other requesting and releasing flows are not allowed when the CGN device requests for/releases the cell.

The present disclosure is further described below with reference to embodiments in detail.

Networking embodiment 1, as shown in FIG. 4:

a hardware part consists of n CGN devices and an AAA server, and the CGN devices and the AAA server support common protocols such as TCP/UDP/ICMP.

In practical application, the following operation may be executed:

A: the CGN devices are configured as follows:

1) configuration of sharing priority of the devices (value=1);

2) configuration of an request threshold (request threshold=40(%));

3) configuration of a release threshold (release threshold=80(%));

4) configuration of an IP address allocation policy in a release state (policy=centralized policy);

5) configuration for a requesting step size (step size=1);

6) configuration of a failure holding time T1 (s);

B: the AAA server is configured as follows:

1) configuration of priority privilege management: if the priority is 1, IP addresses requested for the first time are 2 cells; if the priority is 2, IP addresses requested for the first time are 4 cells; and so on;

2) configuration of log enabling;

3) configuration of a plurality of address pools, each cell averagely having 20 addresses;

C: the CGN devices are powered on and started, NAT modules are initialized, and Address-Request messages containing priority (the priority is 1) are sent to the AAA server through RADIUS interfaces;

D: the AAA server processes the Address-Request messages of the CGN devices, available capacities of the address pools of the AAA server all meet requirements of the CGN devices on the number of IP addresses requested for the first time; the AAA server returns an Address-Request-Reply message to the CGN devices, and puts 2 related cells in a RADIUS message option; at this time, a related log is recorded;

E: the CGN devices receive the corresponding RADIUS REPLY messages, acquire the requested IP addresses and load the addresses into their own address pools for management; the CGN devices also send Address-Request-Reply-Ack messages to the AAA server for acknowledgement;

F: the AAA server receives the Address-Request-Reply-Ack messages, and sets the cells into a service state;

G: the CGN devices finish initialization, and start creating new sessions;

H: after a certain period of time, the CGN devices discover that idle resources under TCP are 1,022,346 when generating certain TCP sessions, 1,022,346/(65535*40) is lower than 40 percent (the request threshold), and the upper limits of the number of the cells of the CGN devices are not reached; the CGN devices instantly send Address-Request RADIUS messages with the step size of 1 to the AAA server to request to reacquire one cell; in addition, there is no influence on the new sessions;

I: when the AAA server receives the Address-Request messages from the CGN devices and there is more than 1 cell remaining in the AAA server, the AAA server sends an Address-Request-Reply message, and puts the related cell in the RADIUS message for sending to the CGN devices; at this time, a related log is recorded;

J: the CGN devices load the IP addresses and continue working after receiving the REPLY message from the AAA server, and also send Address-Request-Reply-Ack messages to the AAA server;

K: after a certain period of time, the CGN devices discover that there are 3,185,001 remaining resources when certain UDP sessions are aged, 3,185,001/(65535*60) is higher than 80 percent (the release threshold), the CGN devices discover that all the cells are occupied, and the centralized policy is adopted as a release policy;

L: when creating new sessions, the CGN devices allocate resources to a certain cell to ensure that the other cells can be released in a centralized manner according to the centralized policy;

M: after a certain period of time, the CGN devices discover that all the sessions of a certain cell may be released due to the aging of the sessions; thus, the CGN devices send RADIUS release request messages containing specified IP addresses to the AAA server, message types of the RADIUS messages being Address-Release;

N: the AAA server receives release request messages from the CGN devices, stores the IP addresses in the release request messages into an idle link, and sends a RADIUS acknowledgement message with a message type Address-Release-Reply to the CGN devices; at this time, a related log is recorded;

O: the CGN devices receive the release acknowledgement message from the AAA server, and delete the IP addresses of the cell; and P: at this time, the process of interaction for IP address allocation between the CGN devices and the AAA server is ended.

The log can ensure the tracing of address allocation, and the log includes, but not limited to, the following fields:

a timestamp;

a device number (identifying the device requesting/releasing an IP address);

a message type (requesting, releasing); and an execution result (success, failure).

Figure 5:
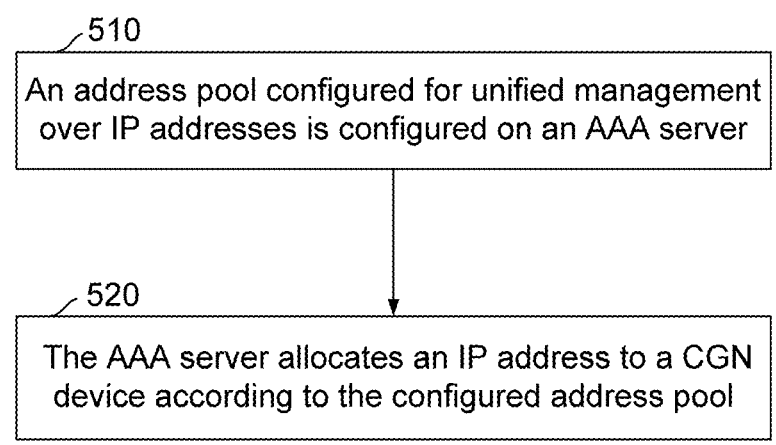
FIG. 5 is a schematic diagram of an address sharing flow according to an embodiment of the present disclosure.

From the above, the operation of implementing address sharing in the embodiment of the present disclosure may represent a flow shown in FIG. 5, and the flow includes the following steps:

Step 510: an address pool configured for unified management over IP addresses is configured on an AAA server; and Step 520: the AAA server allocates an IP address to a CGN device according to the configured address pool.

From the above, regardless of the method, the device and the system, IP address resource sharing among CGN devices is implemented by such a technology for implementing address sharing in the embodiment of the present disclosure, so that problems about resource load sharing among the CGN devices can be solved, a sharing rate of IP address resources is increased, and resource optimization can be implemented; and moreover, in terms of IP address management, a more applicable platform is provided for the operating company. In addition, IP addresses are managed by an AAA server in a unified manner, and then the address pool is not required to be configured on a CGN device, so that the CGN device may be started without any address pool.

The above is only the preferred embodiment of the present disclosure and not intended to limit the scope of protection of the present disclosure.

What is claimed is:

1. A method for implementing address sharing, wherein an Authentication, Authorization and Accounting (AAA) server is configured with an address pool for unified management over Internet Protocol (IP) addresses, the method comprising: allocating, by the AAA server, an IP address to a Carrier Grade Network Address Translation (CGN) device according to the address pool;
  when releasing the IP addresses, an IP address management cell is required to be released wholly, and individual release of the IP addresses is not allowed; if there is no idle IP address management cell to be released, creating a new session for resource according to IP address releasing policy until an idle cell is generated;
  wherein the IP address releasing policy comprises one of:
  a centralized policy: in a release state, IP addresses assigned to the new session are concentrated to one or more cells, IP address resources of other cells enter an idle state after corresponding sessions are aged or manually deleted, and then the whole cells are released;
  a coercive policy: in a release state, a cell with fewer sessions is selected, and the cell is not allowed to be occupied by the new session; moreover, all sessions occupying IP addresses of the cell are deleted, and the cell and the IP address of the cell are coercively released;
  an ignoring policy: in a release state, the release state is ignored when the new session is created if there is no idle IP address management cell, and an IP address resource is continued to be assigned to generate the new session according to an original mode; and after an idle IP address management cell is generated, a releasing flow of the idle IP address management cell is started.

2. The method according to claim 1, further comprising:
  performing, by the AAA server, priority privilege management for the CGN device; and
  when the CGN device is started and requests for an IP address, allocating, by the AAA server, a corresponding number of IP addresses to the CGN device according to priority of the CGN device.

3. The method according to claim 2, further comprising:
  configuring the priority on the CGN device, or
  sending the priority of the CGN device to the CGN device through a Remote Authentication Dial in User Service (RADIUS) message.

4. The method according to claim 1, further comprising:
  configuring, for the CGN device, a request/release threshold serving as a reference for calculating a resource idleness rate, wherein
  for the request threshold, the CGN device is triggered to re-request for an IP address when a resource idleness rate under a protocol is higher than the request threshold;
  for the release threshold, the CGN device is triggered to release the IP address when a resource idleness rate under a protocol is higher than the release threshold.

5. The method according to claim 4, wherein the request/release threshold corresponds to different protocols, wherein
  requesting for an IP address resource is triggered when the resource idleness rate under any protocol corresponding to the request/release threshold is lower than the request threshold; and
  release of the IP address resource is triggered when the resource idleness rate under all protocols corresponding to the request/release threshold is higher than the release threshold.

6. The method according to claim 1, further comprising:
  when the CGN device re-requests for an IP address resource after a request threshold is reached, requesting, by the CGN device, the IP address resource according to a configured step size.

7. The method according to claim 1, wherein RADIUS message interaction is adopted between the CGN device and the AAA server, the method further comprises:
  adding four types to an attributes field of a RADIUS message: a device number, priority, IP address management cell information, and a step size.

8. The method according to claim 1, further comprising:
  recording, by the AAA server, a log involving IP address allocation, the log comprising following fields:
  a timestamp;
  a device number (identifying a device requesting/releasing an IP address);
  an allocated IP address;
  a message type (requesting, releasing); and
  an execution result (success, failure).

9. A device for implementing address sharing, the device being configured with an address pool for unified management over Internet Protocol (IP) addresses, and the device being configured to allocate an IP address to a Carrier Grade Network Address Translation (CGN) device according to the address pool;
  when releasing the IP addresses, an IP address management cell is required to be released wholly, and individual release of the IP addresses is not allowed;
  wherein the device is further configured to: if there is no idle IP address management cell to be released, create a new session for resource according to IP address releasing policy until an idle cell is generated;
  wherein the IP address releasing policy comprises one of:
  a centralized policy: in a release state, IP addresses assigned to the new session are concentrated to one or more cells, IP address resources of other cells enter an idle state after corresponding sessions are aged or manually deleted, and then the whole cells are released;
  a coercive policy: in a release state, a cell with fewer sessions is selected, and the cell is not allowed to be occupied by the new session; moreover, all sessions occupying IP addresses of the cell are deleted, and the cell and the IP address of the cell are coercively released;
  an ignoring policy: in a release state, the release state is ignored when the new session is created if there is no idle IP address management cell, and an IP address resource is continued to be assigned to generate the new session according to an original mode; and after an idle IP address management cell is generated, a releasing flow of the idle IP address management cell is started.

10. The device according to claim 9, wherein the device is configured to perform priority privilege management for the CGN device; and
  when the CGN device is started and requests for an IP address, the device is configured to allocate a corresponding number of IP addresses to the CGN device according to priority of the CGN device.

11. The device according to claim 9, wherein the CGN device is further configured with a request/release threshold serving as a reference for calculating a resource idleness rate, wherein
for the request threshold, the CGN device is triggered to re-request for an IP address when a resource idleness rate under a protocol is higher than the request threshold;
for the release threshold, the CGN device is triggered to release the IP address when a resource idleness rate under a protocol is higher than the release threshold.

12. The device according to claim 11, wherein the request/release threshold corresponds to different protocols, wherein
the CGN device is configured to request for an IP address resource when the resource idleness rate under any protocol corresponding to the request/release threshold is lower than the request threshold; and
the CGN device is configured to release the IP address resource when the resource idleness rate under all protocols corresponding to the request/release threshold is higher than the release threshold.

13. The device according to claim 9, wherein the CGN device is further configured to, when re-requesting for an IP address resource after the request threshold is reached, request for the IP address resource according to a configured step size.

14. The device according to claim 9, wherein Remote Authentication Dial in User Service (RADIUS) message interaction is adopted between the CGN device and the device, and the device is configured to:
add four types to an attributes field to a RADIUS message: a device number, priority, IP address management cell information, and a step size.

15. The device according to claim 9, wherein the device is further configured to record a log involving IP address allocation, the log comprising following fields:
a timestamp;
a device number (identifying the device requesting/releasing an IP address);
an allocated IP address;
a message type (requesting, releasing); and
an execution result (success, failure).

16. The device according to claim 9, wherein the device is an Authentication, Authorization and Accounting (AAA) server, comprising an AAA server management module configured to perform management as follows:
address pool management;
priority privilege management; and
log management.

17. The device according to claim 9, wherein the CGN device comprises a user configuration module, an IP address resource requesting/releasing module and an IP address resource management module, wherein
the user configuration module is configured to perform configuration involving a sharing policy; the sharing policy comprises at least one of following: priority, a threshold and a step size;
the IP address resource requesting/releasing module is configured to calculate a resource idleness rate and to request/release the IP address according to the resource idleness rate; and
the IP address resource management module is configured to manage an IP address resource.

18. A system for implementing address sharing, comprising an Authentication, Authorization and Accounting (AAA) server and a Carrier Grade Network Address Translation (CGN) device, wherein
the AAA server is configured with an address pool configured for unified management over Internet Protocol (IP) addresses, and the AAA server is configured to allocate an IP address to the CGN device according to the address pool; and
the CGN device is configured to interact with the AAA server and perform IP address management comprising application and/or releasing of the IP addresses;
wherein the AAA server comprises an AAA server management module, configured to perform management as follows:
address pool management;
priority privilege management; and
log management;
the CGN device comprises a user configuration module, an IP address resource requesting/releasing module and an IP address resource management module, wherein
the user configuration module is configured to perform configuration involving a sharing policy; the sharing policy comprises at least one of following: priority, a threshold and a step size;
the IP address resource requesting/releasing module is configured to calculate a resource idleness rate and request/release the IP address according to the resource idleness rate; and
the IP address resource management module is configured to manage an IP address resource;
when releasing the IP addresses, an IP address management cell is required to be released wholly, and individual release of the IP addresses is not allowed;
wherein the CGN device is further configured to: if there is no idle IP address management cell to be released, create a new session for resource according to IP address releasing policy until an idle cell is generated;
wherein the IP address releasing policy comprises one of:
a centralized policy: in a release state, IP addresses assigned to the new session are concentrated to one or more cells, IP address resources of other cells enter an idle state after corresponding sessions are aged or manually deleted, and then the whole cells are released:
a coercive policy: in a release state, a cell with fewer sessions is selected, and the cell is not allowed to be occupied by the new session; moreover, all sessions occupying IP addresses of the cell are deleted, and the cell and the IP address of the cell are coercively released;
an ignoring policy: in a release state, the release state is ignored when the new session is created if there is no idle IP address management cell, and an IP address resource is continued to be assigned to generate the new session according to an original mode; and after an idle IP address management cell is generated, a releasing flow of the idle IP address management cell is started.

* * * * *